Patented June 22, 1954

2,681,905

UNITED STATES PATENT OFFICE 2,681,905

SYNTHETIC LUBRICANTS

William E. Garwood, Haddonfield, Francis M. Seger, Pitman, and Alexander N. Sachanen, Woodbury, N. J., assignors to Socony-Vacuum Oil Company, Incorporated, a corporation of New York No Drawing. Application March 8, 1950, Serial No. 148,504

10 Claims. (Cl. 260—139)

This invention has to do with synthetic lubricants and, more particularly, has to do with a process for preparing a new and novel class of synthetic lubricants from sulfur and polymers of normal, alpha mono-olefins.

As is well known to those familiar with the art, hydrocarbons have been sulfurized by various means to develop products useful as lubricants or suitable for use as adjuvants. Considerable attention has been directed to sulfurization of olefins and olefin polymers, in view of the known ease of reaction between sulfur and unsaturated materials. Generally, the products prepared by sulfurizing olefins contain relatively large amounts of sulfur, are dark in color and are characterized by a relatively low viscosity index and/or high pour point, all of which properties limit their utility. For example, such products are effective for use in cutting oils or even as cutting oils per se, but are not suitable for use as lubricants for internal combustion engines.

In all of the prior art, however, there has been no reported success in the preparation of stable synthetic lubricants of low sulfur content, high viscosity index and low pour point of the character described hereinafter. Recently, it was discovered that certain mono-olefins can be polymerized with sulfur under well-defined conditions to form successfully synthetic lubricants having the aforesaid desirable properties. This discovery was described in our copending application Serial No. 63,204, filed December 2, 1948 (now Patent No. 2,500,164), of which this application is a continuation-in-part. As described in the aforesaid copending application, novel synthetic lubricants are formed by reacting normal, alpha mono-olefins having from about six to about fourteen carbon atoms per molecule, with sulfur at temperatures within the range of about 550° F. to 750° F., the quantity of sulfur so reacted being from about 0.01 mol (atomic weight) to about 0.15 mol, per mol of olefin.

Although the synthetic lubricants of our aforesaid application are of excellent character, the relatively low yield of product obtained from a given quantity of olefin reactant constitutes an economic disadvantage. We have now found that this disadvantage can be overcome without any substantial sacrifice in quality of the lubricants. Specifically, we have found that synthetic lubricants of excellent quality are obtained by reacting, in a non-oxidizing atmosphere, certain polymers of normal, alpha mono-olefins having from about six to about fourteen carbon atoms per molecule, with sulfur at temperatures within the range of about 500° F. to about 750° F. for a period of time varying from about ten hours to about one-half hour, respectively, the quantity of sulfur so reacted being from about 0.1 to about 5 per cent, by weight, of the total charge.

REACTANTS

The hydrocarbon reactants of this invention are polymers of normal, alpha mono-olefins having from about six to about twelve carbon atoms per molecule, and preferably from about eight to twelve carbons. These polymers are obtained by the thermal process described in copending application Serial No. 104,932, filed July 15, 1949 (now Patent No. 2,500,166). As explained in the latter application normal, alpha mono-olefins are heated, in the absence of a catalyst, at a temperature between about 600° F. and about 750° F. for a period of time from about twenty hours to about one hour, respectively. The reaction products obtained by this non-catalytic process contain unreacted or unconverted olefin, relatively low molecular weight olefin polymers and residual oil. These reaction products are characterized by boiling ranges from about 150° F. to about 930° F. (@ 760 mm., Hg), at which maximum temperature at least about eighty per cent by weight of the product distills. A related characteristic of this charge is an average molecular weight range of from about 150 to about 600 [calculated from distillation and gravity data by the method of Mills, Hirschler, and Kurtz, Ind. Eng. Chem., 38, 442 (1946)].

We have found that the foregoing reaction products can be reacted, under conditions defined herein, with sulfur to provide excellent synthetic lubricants. The sulfur so reacted is combined in the lubricant product in stable form, such that the product is non-corrosive in the conventional copper strip test. Thus, the product generally does not require subsequent treatment with an alkaline material, such as caustic, to remove loosely bound sulfur.

It has also been found that the aforesaid reaction products obtained by the thermal process described in application Serial No. 104,932, can be fractionated to remove the unconverted olefin therein, and the remaining polymeric material can be used as charging stock in the process of this invention. The polymeric material, including residual oil, has a boiling range from about 400° F. to about 930° F.+(@ 760 mm., Hg), and an average molecular weight from about 300 to about 600. After topping of the reaction product to the desired degree, i. e. to about 750° F., a non-corrosive lubricant is obtained.

Another useful fraction of the reaction product obtained by the aforesaid process of application Serial No. 104,932, is the polymeric material from which has been fractionated the unconverted olefin and low molecular weight polymers. This fraction will boil between about 750° F. and about 930° F.+, and have an average molecular weight of 400 to 600. The synthetic lubricants obtained by reacting this polymeric material with sulfur generally contain some corrosive sulfur or corrosive sulfur products and require subsequent treatment with an alkaline material, steam, etc.

The mono-olefins used in the preparation of the hydrocarbon charge of this invention, are normal or straight-chain alpha, mono-olefins and contain from about six to about twelve carbon atoms per molecule. Such mono-olefins are normally liquid at temperatures of the order of 20–25° F. Illustrative of such olefins are: n-hexene-1, n-octene-1, n-decene-1, n-dodecene-1, and the like. Preferred of such olefins, however, are those having from eight to twelve carbon atoms, with n-decene-1 forming particularly outstanding synthetic lubricants of this invention. It will be clear from the foregoing examples that an alpha olefin may also be referred to as a 1-olefin.

Not only can the mono-olefins of the aforesaid character be used individually in this invention, but they can also be used in admixture with each other. In addition, olefin mixtures containing a major proportion, preferably eighty per cent (by weight) or more, of such mono-olefins can be used. Representative of such mixtures are those obtained by the cracking of paraffin waxes and other paraffin products, and those obtained from the Fischer-Tropsch and related process. These hydrocarbon mixtures can contain, in addition to the 1-olefin or 1-olefins, such materials as: other olefins, paraffins, naphthenes and aromatics, with some resulting adverse influence upon the properties of the products.

In contrast to the foregoing normal, alpha mono-olefins and polymers thereof, polymers of other olefins provide substantially lower yields of lubricants when reacted with sulfur, and these lubricants are normally of much lower quality than are those prepared from the 1-olefins defined above. Typical olefins providing less desirable products, under the conditions of the present process, are: 2-ethylhexene-1 and octene-2.

Polymerization and concurrent sulfurization of the aforesaid polymer charges is effected with elemental sulfur. Also contemplated herein, however, are the related elemental substances: selenium and tellurium, which provide excellent synthetic lubricants in the process of this invention. Selenium and tellurium can replace sulfur in part or in entirety, and mixtures of two or all three of said substances can be used. It will be noted that each of these elements is in Class VI–B of Mendelejeff's Periodic Table, with atomic weights ranging from 32 to 128.

In view of the availability and low cost of sulfur, and particularly in view of the outstanding character of the oils obtained therewith, sulfur is particularly preferred herein. It is on this basis that the following discussion and illustrative examples are directed to reactions involving sulfur.

REACTION CONDITIONS

Reaction of the aforesaid n-olefin-1 polymers and polymeric materials is effected under critical conditions. Temperature must be maintained within the range of about 500° F. to about 750° F., and preferably at about 600° F. Reaction is generally complete in from one-half hour to ten hours, with the higher reaction temperatures being used for the shorter reaction periods, and with the lower reaction temperatures being used for the longer reaction periods. Generally, periods of one-half hour to three hours are maintained with temperatures in the neighborhood of 750° F., and periods of five to ten hours with temperatures of the order of 500° F. Excellent results have been realized with a temperature of about 600° F. maintained for about ten hours.

Important also is the proportion of sulfur used with the polymer. Excellent results are realized when from about 0.1 to about 5 per cent, by weight, of the total charge is sulfur.

Another critical feature is the medium or atmosphere in which reaction is effected. To obtain the synthetic lubricants of this invention, it is necessary to use a substantially non-oxidizing atmosphere such as nitrogen, carbon dioxide, hydrogen, etc. In this connection, it has been found that with an atmosphere of hydrogen, synthetic lubricants of extremely light color are obtained. Oxygen is known to react with unsaturated materials at high temperatures to provide acidic materials of dark color.

As shown hereinafter, the interrelation of hydrocarbon charge, temperature, time, proportion of reactants and reaction atmosphere, provides the particularly outstanding synthetic lubricants of this invention. When either or several of these factors falls without the limits defined above, substantially inferior lubricants are formed or lubricants are obtained in but small yield.

Pressures ranging from atmospheric to 4000 pounds per square inch, most frequently about 500 pounds, characterize the reaction. It is desirable to use sufficient pressure to maintain the reactants in liquid state.

It will be understood, of course, that the reaction is aided by providing adequate mixing of the reactants. This can be provided by using various means which are well known in the art. At the reaction conditions, the reactants are mutually soluble and homogeneity is readily attained.

EXAMPLES

In order to illustrate the principles of this invention, the results of a series of typical, and non-limiting, reactions are set forth in tabular form in Tables I–IV below. These reactions were carried out in a rocking-type bomb (American Instrument Co). The reactants were charged to the bomb, the free space was swept with nitrogen, hydrogen or the like, and the bomb was heated to the desired temperature for the desired period of time. Thereafter, the bomb was cooled and discharged. It should be noted that the reaction times, recited as "Time, Hours" in Tables I–IV represent the time intervals during which the bomb was maintained at the desired temperature, and do not include the time intervals necessary to heat the bomb and its contents to the desired temperature, and do not include the time intervals necessary to cool the bomb after heat to the bomb has been discontinued. Normally, about 1½ hours are required to raise the temperature of the bomb to about 650° F.; similarly, several (about 8) hours are required for the bomb to cool to room temperature after being maintained at 650° F. for ten hours.

The reaction products discharged from the bomb, or other suitable reaction vessel, were topped or otherwise treated as indicated and filtered as in the runs shown in Tables I–IV. To distinguish the synthetic lubricants from the distillate fractions of the reaction products, the synthetic lubricants are identified as "residual oils." The latter term identifies the oils from which unreacted materials and products of intermediate boiling range have been separated.

All of the tests and analyses to which the residual oils in Tables I–IV were subjected are well known standard tests. In this connection, it will be noted that the designation "N. N." refers to the neutralization number, which is a measure of the acidity of the oil. The abbreviation "K. V. at 210° F., Cs." is used to identify the kinematic viscosity (of the residual oils) at 210° F. measured in centistokes.

yield and is of good quality. As shown hereinafter, however, the stability of the residual oil of run 1 is only of the same order as Pennsylvania type lubricants, which require oxidation inhibitors when used in present day operation.

The residual oils of runs 2 and 4 are illustrative of those described in our application Serial No. 63,204 (Now Patent No. 2,500,164), and have highly desirable properties. For example, they are more stable to oxidation than the residual oil of run 1 and Pennsylvania type lubricants. A disadvantage attending the residual oils of runs 2 and 4 is their low yield. Run 3 is included here to show the effect of increasing the sulfur reactant; yield and viscosity index are decreased and sulfur content is increased.

Runs 5, 6 and 7 illustrate the present invention. It will be noted that the residual oils of these runs are formed in high yield and yet have all the desirable properties of the oils shown by runs 1, 2 and 4. Particularly, the oils are appreciably more stable than the oil of run 1, formed by thermal conversion of n-decene-1. Comparing the oils of runs 2 and 4, formed by reacting sulfur with n-decene-1, with the oils of runs 5, 6 and 7, it is seen that a much greater yield of lubricant is obtained from a given quantity of n-decene-1 monomer by operating in accordance with the present invention.

An additional feature shown by runs 5, 6 and 7 resides in the character of the sulfur in the synthetic lubricant products. The oils of runs 5 and 6 are formed from the n-decene-1 reaction product and are not corrosive to copper in the copper strip test; whereas, the oil of run 7 is

*Table I*

| Run No. | 1 | 2 | 3 | 4 | 5 | 6 | 7 |
|---|---|---|---|---|---|---|---|
| Hydrocarbon | n-Decene-1 | n-Decene-1 | n-Decene-1 | n-Decene-1 | Polymer Reaction Product [2] | Polymer Reaction Product [2] | Polymer [3] |
| Boiling Range, °F | 340 | 340 | 340 | 340 | 340–930+[5] | 340–930+[5] | 750–930+[5] |
| Molecular Wt | 140 | 140 | 140 | 140 | 300 [5] | 300 [5] | 500 [5] |
| Parts by Wt | 280 | 280 | 280 | 700 | 300 | 225 | 170 |
| Sulfur: | | | | | | | |
| Parts by Wt | | 2 | 16 | 5 | 7.5 | 12 | 8 |
| Percent (Wt.) of Charge | | 0.7 | 5.4 | 0.7 | 2.4 | 5 | 4.5 |
| Temperature, °F | 610 | 600 | 610 | 652 | 605 | 601 | 607 |
| Time, Hrs | 10¼ | 10 | 10 | 10¼ | 10 | 10¼ | 10 |
| Max. Pressure, p. s. i. g | 300 | 100 | 300 | 425 | 150 | 200 | 150 |
| Atmosphere | N₂ | N₂ | N₂ | N₂ | N₂ | N₂ | N₂ |
| Residual Oil: | | | | | | | |
| Yield, Percent (Wt.) [1] | 48.6 | 15.2 | 10.7 | 26.4 | 51.0 | 61.2 | 53.0 |
| K. V. @ 210° F., Cs | 5.72 | 3.69 | 5.12 | 3.59 | 3.94 | 4.74 | 4.39 |
| V. I. | 143 | 142 | 108 | 128 | 141 | 139.8 | 147 |
| Pour Point, °F | −20 | <−30 | <−35 | −20 | −5 | 10 | 5 |
| N. N. | 0.3 | 0.3 | 1.5 | 0.2 | 0.1 | 0.4 | 0.2 |
| Specific Gravity | 0.8333 | 0.8378 | 0.9047 | 0.8383 | 0.8383 | 0.8519 | 0.8448 |
| Color (Lovibond) | | | | 20 | 2.5 | 40 | 103 |
| Sulfur, Percent | | 2.37 | 6.71 | 1.15 | 1.36 | 1.78 | 0.41 |
| Oxidation Stablity No. [4] | 6 | | | 0 | | 0 | 0 |

[1] Overall yield, based upon original charge materials, that is, n-olefin-1 monomer and sulfur.
[2] Reaction product obtained by thermal conversion of n-decene-1 at 650° F. for 10 hours (see S. N. 104,932).
[3] Residual oil formed by thermal conversion of n-decene-1 at 650° F. for 10 hours (see S. N. 104,932).
[4] Explained at Table V, below.
[5] Estimated from typical polymer distribution curve (monomer, dimer, etc.).

The data in Table I provides a comparison of synthetic lubricants obtained by thermal conversion of n-decene-1 as described in application Serial No. 104,932 (now Patent No. 2,500,166) and illustrated by run 1; by reaction of n-decene-1 with sulfur as illustrated by runs 2, 3 and 4; and by reaction of n-decene-1 polymeric reaction products with sulfur as typified by runs 5, 6 and 7. The synthetic lubricant obtained by thermal conversion—run 1—is formed in high formed from the residual oil portion of the n-decene-1 reaction product and is corrosive to copper in the same test. The corrosive nature of the oil of run 7 is overcome easily however, as by treatment with a small amount of an alkali, such as sodium hydroxide, or by steam distillation, or by topping under reduced pressure. In addition, a greater proportion of the sulfur charge reacted in runs 5 and 6 than in run 7, as indicated by the sulfur contents of the products. This is due to the greater degree of unsaturation of the polymerization mixture charge as compared with the residual oil charge.

As indicated hereinabove, the configuration of the hydrocarbon used is critical. This is revealed by the data shown in Table III below.

*Table III*

| Run No | 13 | 14 | 15 |
|---|---|---|---|
| Hydrocarbon | n-Octene-1 [a] | n-Octene-2 [b] | 2-Ethyl hexene-1. |
| Parts by Wt | 300 | 200 | 200. |
| Temperature, °F | 610 | 650 | 650. |
| Time, Hrs | 10 | 20 | 9. |
| Max. Pressure, p. s. i. g | 700 | 900 | 1,150. |
| Atmosphere | $N_2$ | $N_2$ | $N_2$. |
| Residual Oil: | | | |
| Yield, Percent Wt | 29.6 | 10.5 | 1.5. |
| K. V. @ 210° F., Cs | 5.17 | 3.26 | 2.34. |
| V. I | 126.2 | 34.8 | 51.7. |
| Pour Point, °F | <−70 | <−30 | <−30. |
| N. N | 0.2 | 1.0 | 1.95. |
| Specific Gravity | 0.8413 | 0.8607 | |
| Color (Lovibond) | | | |
| Sulfur, Percent | | | |

[a] Commercial grade octene-1 is approximately 90% n-octene-1 (infrared analysis).
[b] Commercial grade octene-2 is approximately 58% n-octene-2 and 42% n-octene-1 (infrared analysis).

The influence of a hydrogen atmosphere upon the synthetic lubricant products of this invention is shown by data presented in Table II below.

As shown by runs 13, 14 and 15, a normal, alpha monoolefin is far superior to other monoolefins of the same chain length when converted thermally. When the olefin polymers, such as

*Table II*

| Run No | 8 | 9 | 10 | 11 | 12 |
|---|---|---|---|---|---|
| Hydrocarbon | Polymer Oil [7] | Polymer [2] Reaction Product. | Polymer [2] Reaction Product. | Polymer [2] Reaction Product. | Polymer [2] Reaction Product. |
| Boiling Range, °F [6] | 750–930+ | 400–930+ | 400–930+ | 400–930+ | 400–930+. |
| Molecular Wt. [6] | 500 | 350 | 350 | 350 | 350. |
| Parts by Wt | | 200 | 200 | 765 | 787. |
| Sulfur: | | | | | |
| Parts by Wt | | 2 | 4 | 15 | 31. |
| Percent (Wt.) of Charge | | 1 | 2 | 1.9 | 3.8. |
| Temperature, °F | | 600 | 600 | 602 | 602. |
| Time, Hours | | 5 | 5 | 5 | 5. |
| Max. Pressure, p. s. i. g | | 150 | 2,300 | 2,125 | 2,675. |
| Atmosphere | $N_2$ [4] | $H_2$ [5] | $H_2$ [5] | $H_2$ [5] | $H_2$ [5]. |
| Residual Oil: | | | | | |
| Yield, Percent Wt. [1] | 18.4 | 22.5 | 22.1 | 18.1 | 20.3. |
| K. V. @ 210° F., Cs | 6.35 | 5.71 | 5.87 | 5.85 | 5.90. |
| V. I | 88.3 | 96.1 | 99.3 | 89.9 | 98.9. |
| Pour Point, °F | <−30 | −10 | <−30 | <−30 | <−30. |
| N. N | 0.5 | 0.2 | 0.2 | 0.2 | 0.2. |
| Specific Gravity | 0.8905 | 0.8877 | 0.8827 | 0.8778 | 0.8822. |
| Color (Lovibond) [3] | 325 | 300 | 78 | 64 | 50. |
| Sulfur, Percent | | 0.53 | 0.42 | 0.57 | 0.91. |

[1] Overall yield, based upon original charge materials, that is, n-olefin-1 monomer fraction and sulfur.
[2] Reaction product obtained by thermal conversion of an olefinic fraction (boiling range 137–570° F.), at 650° F. for 10 hours (see S. N. 104,932); olefinic fraction contains a major proportion of $C_6$–$C_{16}$ normal, alpha mono-olefins.
[3] After filtration through thin coat of diatomaceous earth filter aid (Super Filtrol).
[4] Bomb pressured to approximately 2000 p. s. i. g. with $N_2$ to test for leaks; then pressure was released and system was closed before heat was applied.
[5] Bomb pressured four times with $H_2$ to 1000–1500 p. s. i. g. and pressure was released each time; then bomb was pressured a fifth time to 1000–1500 p. s. i. g. and the system was closed before heat was applied.
[6] Estimated from typical polymer distribution curve (monomer, dimer, etc.).
[7] Reaction product obtained by thermal conversion of olefinic fraction (note 2) at 650° F. for 12 hours (see S. N. 104,932).

It will be noted upon inspection of the data in Table II that the synthetic lubricants prepared in a hydrogen atmosphere are characterized by low color values. The products shown in Table II, however, have relatively low yields and viscosity indices, which are attributed to the charge material. The raw charge contained, in addition to a major proportion of normal, alpha mono-olefins, substantial quantities of contaminants such as non-alpha olefins, paraffins, aromatics and oxygen-containing compounds (alcohols, aldehydes, etc.).

those obtained in runs 13–15, are reacted with sulfur under the conditions of the present invention, a similar relationship will characterize the products of reaction. Thus, in view of yield and viscosity index consideration, polymers of normal, alpha mono-olefins are necessary for the process described herein. Polymers from olefins of still different character are wholly unsuited.

Another critical feature of the present process is reaction temperature. Data illustrating this feature is embodied in Table IV below.

Table IV

| Run No. | 16 | 17 | 18 | 19 |
|---|---|---|---|---|
| Hydrocarbon | Polymer [1] | Polymer [1] | Polymer [1] | Polymer [1]. |
| Boiling Range, °F.[3] | 750-930+ | 750-930+ | 750-930+ | 750-930+. |
| Molecular Wt.[3] | 500 | 500 | 500 | 500. |
| Parts by Wt | 100 | 100 | 170 | 150. |
| Sulfur: | | | | |
| Parts by Wt | 5 | 5 | 8 | 7. |
| Percent (Wt.) of Charge | 4.7 | 4.7 | 4.5 | 4.5. |
| Temperature, °F | 410 | 500 | 607 | 700. |
| Time, Hrs | 10 | 10 | 10 | 3. |
| Max. Pressure, p. s. i. g | 100 | 150 | 150 | 200. |
| Atmosphere | N₂ | N₂ | N₂ | N₂. |
| Residual Oil: | | | | |
| Yield, Percent Wt.[4] | 51.0 | 53.8 | 53.0 | 46.1. |
| K. V. @ 210° F., Cs | 6.26 | 5.46 | 4.39 | 3.81. |
| V. I. | 136.3 | 142 | 147 | 143. |
| Pour Point, °F | −5 | −10 | 5 | 10. |
| N. N | 1.0 | 0.1 | 0.2 | 0.3. |
| Specific Gravity | 0.8555 | 0.8514 | 0.8448 | 0.8428. |
| Color (Lovibond) [2] | >750 | 410 | 103 | 125. |
| Sulfur, Percent | 2.14 | 1.36 | 0.41 | 0.80. |

[1] Residual oil of product obtained by converting n-decene-1 at 650-652° F. for 10-15 hours, topped to 200° C. at 2 mm. (Hg).
[2] Crude reaction products were washed three times with 10% aqueous NaOH solution, petroleum ether was added to complete separation, and the raffinates were filtered through paper and petroleum ether was distilled off.
[3] Estimated from typical polymer distribution curve (monomer, dimer, etc.).
[4] Overall yield based upon original charge, i. e., n-olefin-1 monomer and sulfur.

It will be seen from the data in Table IV, that an undesirably high degree of color characterizes the product obtained at 410° F. (run 16). Substantially lighter colored products are obtained at temperatures within the range 500° F.–750° F., with products of least color being obtained at about 600° F.

The stability of the oils of this invention is revealed by the results of a catalytic oxidation test, to which were subjected several of the residual oils shown in Tables I–IV, above. In this test 6.5 feet of No. 14 (Brown and Sharpe Gauge) iron wire (15.6 square inch), 6.2 inches of No. 18 (B. & S.) copper wire (0.78 square inch), 3.33 inches of No. 12 (B. & S.) aluminum wire (0.87 square inch), a ¼ inch square of $\frac{1}{16}$ inch lead sheet ($\frac{1}{16}$ square inch), and 25 ccs. of the test oil were placed in a glass test tube, heated to 260° F. and air blown therethrough at the rate of 10 liters per hour for 40 hours. The results reported at the end of the test are: neutralization number (N. N.); per cent viscosity increase at 210° F.; sludge and lacquer; and lead weight loss (in milligrams). The oil is compared with a reference oil of similar viscosity and is rated on the basis of N. N. increase, viscosity increase, sludge formation, and lead weight loss. A maximum of three demerits is assigned to each of the rated factors. The sum of the demerits is designated the "stability number," and ranges from 0 to 12. The reference mineral oils, solvent refined Pennsylvania oils, have stability numbers of 6 to 7.

As will be evident from the data presented above in Tables I through V, the products of this invention are highly desirable lubricants per se. They are also of considerable value as blending agents for other lubricating oils. In view of the inherent stability of the synthetic oils, they impart stability to the oils with which they are blended. So also, they impart desirable viscosity index (V. I.) and pour point characteristics to the oils in combination therewith, for, as indicated above, they have advantageous viscosity index and pour point properties. In short, the synthetic oils find utility in "upgrading" other lubricants. Typical oils with which the synthetic oils may be blended are mineral oils such as are normally used in internal combustion and turbine engines. When so blended, the synthetic oils may comprise the major proportion of the final blended oil, or may even comprise a minor proportion thereof.

One or more of the individual properties of the synthetic lubricants of this invention may be further improved by incorporating therewith a small, but effective amount, of an addition agent such as a detergent, an extreme pressure agent, a foam suppressor, a viscosity index (V. I.) improver, etc. Typical detergents which may be so used are metal salts of alkyl-substituted aromatic sulfonic or carboxylic acids, as illustrated by diwax benzene barium sulfonate and barium phenate, barium carboxylate of a wax-substituted phenol carboxylic acid. Extreme pressure agents are well known; illustrating such materials are numerous chlorine and/or sulfur containing compositions, one such material be-

Table V
CATALYTIC OXIDATION TEST

| Oil Run No. | N. N. | K. V. @ 210° F. Cs. | Percent Vis. Increase | Sludge, Tube | Copper Coil | Pb Loss Mgms. | Oil Rated Against | Stability No. |
|---|---|---|---|---|---|---|---|---|
| Penna. SAE 10W Oil | 16 | 12.91 | 125 | Nil | | 235 | | 6-7 |
| Typical n-decene-1 polymer | 10.1 | 12.96 | 126 | Nil | Bright Cu | 303.9 | Penna. SAE 10W | 6 |
| 6 | 1.0 | 5.10 | 7.5 | Nil | Brown | 23.1 | Penna. SAE 10W | 0 |
| 7 | 0.5 | 5.09 | 15.9 | Nil | ....do | 26.2 | Penna. SAE 10W | 0 |
| 17 | 0.8 | 5.88 | 7.3 | Nil | Dull Brass | 18.9 | Penna. SAE 10W | 0 |

The results provided in Table V above clearly indicate the superior quality of the lubricants prepared according to the process described herein.

ing a chlornaphtha xanthate. Silicones, such as dimethyl silicone, may be used to illustrate foam suppressing compositions. Viscosity index improving agents which may be used are typified by polypropylenes, polyisobutylenes, polyacrylate esters, and the like.

Contemplated also as within the scope of this invention is a method of lubricating relatively moving surfaces by maintaining therebetween a film consisting of any of the aforesaid oils.

It is to be understood that the foregoing description and representative examples are non-limiting and serve to illustrate the invention, which is to be broadly construed in the light of the language of the appended claims.

We claim:

1. The process for preparing a stable, viscous oil of high viscosity index, which comprises: reacting, in a non-oxidizing atmosphere at a temperature between about 500° F. and about 750° F. for a period of time from about ten hours to about one-half hour, respectively, a polymeric hydrocarbon reaction product with an elemental substance selected from the group consisting of sulfur, selenium and tellurium, the quantity of said elemental substance being from about 0.1 per cent to about 5 per cent, by weight, of total reactants, and said polymeric reaction product: having a boiling range from about 150° F. to about 930° F., at which maximum temperature at least about 80 per cent by weight thereof distills, having an average molecular weight from about 150 to about 600, and obtained by thermally and non-catalytically heating in the absence of said elemental substance, a charge consisting essentially of hydrocarbons containing at least about 80 per cent by weight of a normal, alpha mono-olefin having between six and about twelve carbon atoms per molecule, at a temperature between about 600° F. and about 750° F. for a period of time from about twenty hours to about one hour, respectively.

2. The process for preparing a stable, viscous oil of high viscosity index, which comprises: reacting, in a non-oxidizing atmosphere at a temperature between about 500° F. and about 750° F. for a period of time from about ten hours to about one-half hour, respectively, a polymeric hydrocarbon reaction product with sulfur, the quantity of sulfur being from about 0.1 per cent to about 5 per cent, by weight, of total reactants, and said polymeric reaction product: having a boiling range from about 150° F. to about 930° F., at which maximum temperature at least about 80 per cent by weight thereof distills, having an average molecular weight from about 150 to about 600, and obtained by thermally and non-catalytically heating in the absence of sulfur, a charge consisting essentially of hydrocarbons containing at least about 80 per cent by weight of a normal, alpha mono-olefin having between six and about twelve carbon atoms per molecule, at a temperature between about 600° F. and about 750° F. for a period of time from about twenty hours to about one hour, respectively.

3. The process as defined in claim 2 wherein the charge consists essentially of a normal, alpha mono-olefin having between about eight and about twelve carbon atoms per molecule.

4. The process as defined in claim 2 wherein said polymeric hydrocarbon reaction product and sulfur are reacted at about 600° F. for about ten hours.

5. The process as defined in claim 2 wherein the non-oxidizing atmosphere is hydrogen.

6. The process for preparing a stable viscous oil of high viscosity index, which comprises: reacting, in a non-oxidizing atmosphere at a temperature between about 500° F. and about 750° F. for a period of time from about ten hours to about one-half hour, respectively, a hydrocarbon polymer with an elemental substance selected from the group consisting of sulfur, selenium and tellurium, the quantity of said elemental substance being from about 0.1 per cent to about 5 per cent, by weight, of total reactants, and said hydrocarbon polymer: having a boiling range from about 750° F. to about 930° F., at which maximum temperature at least about 80 per cent by weight thereof distills, having an average molecular weight from about 400 to about 600, and obtained by thermally and non-catalytically heating in the absence of said elemental substance, a charge consisting essentially of hydrocarbons containing at least about 80 per cent by weight of a normal, alpha mono-olefin having between six and about twelve carbon atoms per molecule, at a temperature between about 600° F. and about 750° F. for a period of time from about twenty hours to about one hour, respectively; and treating the product obtained by said condensation until said product is non-corrosive to copper.

7. The process for preparing a stable viscous oil of high viscosity index, which comprises: reacting, in a non-oxidizing atmosphere at a temperature between about 500° F. and about 750° F. for a period of time from about ten hours to about one-half hour, respectively, a hydrocarbon polymer with sulfur, the quantity of sulfur being from about 0.1 per cent to about 5 per cent, by weight, of total reactants, and said hydrocarbon polymer: having a boiling range from about 750° F. to about 930° F., at which maximum temperature at least about 80 per cent by weight thereof distills, having an average molecular weight from about 400 to about 600, and obtained by thermally and non-catalytically heating in the absence of sulfur, a charge consisting essentially of hydrocarbons containing at least about 80 per cent by weight of a normal, alpha mono-olefin having between six and about twelve carbon atoms per molecule, at a temperature between about 600° F. and about 750° F. for a period of time from about twenty hours to about one hour, respectively; and treating the product obtained by said condensation with an alkaline material until said product is non-corrosive to copper.

8. The process as defined in claim 7 wherein the charge consists essentially of a normal, alpha mono-olefin having between about eight and about twelve carbon atoms per molecule.

9. The process as defined in claim 7 wherein said polymer and sulfur are reacted at about 600° F. for about ten hours.

10. The process as defined in claim 7 wherein the non-oxidizing atmosphere is hydrogen.

References Cited in the file of this patent

UNITED STATES PATENTS

| Number | Name | Date |
| --- | --- | --- |
| 2,338,829 | Werntz | Jan. 11, 1944 |
| 2,424,402 | Loane et al. | July 22, 1947 |
| 2,500,164 | Garwood et al. | Mar. 14, 1950 |
| 2,500,166 | Seger et al. | Mar. 14, 1950 |
| 2,500,167 | Garwood et al. | Mar. 14, 1950 |